Patented Sept. 27, 1932

1,879,877

UNITED STATES PATENT OFFICE

VICTOR LEFEBURE, OF LONDON, ENGLAND

PROCESS FOR THE MANUFACTURE OF PLASTERS FROM ANHYDRITE

No Drawing.　　Application filed November 8, 1928. Serial No. 318,101.

This invention relates to the manufacture of plasters from anhydrite and it has for its object a process of manufacture of an improved kind of plaster.

It is a well-known fact that burnt gypsum or plaster of Paris, $CaSO_4.\tfrac{1}{2}H_2O$, on treatment with water, passes rapidly into a more hydrated form, $CaSO_4, 2H_2O$ (gypsum) which sets to a hard mass. It has been claimed that totally dehydrated gypsum can also be made to set on rehydration, forming the so-called flooring and hard finish plasters, although the set is very much slower than in the case of plaster of Paris. It is doubtful, however, whether such gypsum is totally dehydrated (Van't Hoff and Just. der Hydraulische oder sogenante Estrichgips, Sitzungsberichte der Kgl. Preuss. Akad. der Wissenschaften, 1903, vol. 1, pp. 249–258).

It has always been stated, however, that the natural mineral anhydrite, which consists essentially of anhydrous calcium sulphate, has no setting properties (see J. W. Mellor—A Comprehensive Treatise on Inorganic and Theoretical Chemistry—Volume III, pp. 768–775). One method whereby this material has been utilizable hitherto for the manufacture of plasters is by its gradual hydration to gypsum by a very long weathering process, when it can be used for the manufacture of plaster of Paris in the usual way by an industrial roasting operation (Thorpe's dictionary—see under anhydrite). It has also been proposed to use anhydrite for the manufacture of imitation marble by burning a mixture of anhydrite with alum.

By a simple addition of small percentages of certain inorganic salts to natural mineral anhydrite, as described in the specification of my British Patent No. 236,695, I have been able to dispense with burning and nevertheless to cause this to set to a solid mass, harder and stronger than ordinary plaster of Paris and approximating in strength to high class qualities of plasters, such as those known as Keene's, Mack's, and Parian plasters. The salts which I have found most satisfactory for this purpose are salts of alkali metals, such as sodium and potassium sulphate and carbonate, and double salts of alkali metals with other elements, such as alum (potassium aluminium sulphate), but the process is not restricted to these alone.

I have now found that, instead of the double salts themselves, mixtures of the component inorganic salts which constitute the double salts may advantageously be used in the manner above described, whether these components are those of a given double salt or whether one is a component of one double salt, and the other a component of another double salt; in the latter case, the two components are not necessarily such as to be able to form a double salt with each other. The product obtained by this modification of the process is an improved plaster of more homogeneous constitution, and which has the additional advantage of being cheaper as the constituents used in its manufacture are less costly than the corresponding double salt to which they form together.

Another advantage of the product obtainable by the present improved process is that, when using a double salt, the proportions of the constituents of the double salts are fixed and therefore cannot be altered in the finished product; on the contrary, when using, separately, the constituents of the double salt, their respective proportions in the final product can be varied as desired. The technical improvements of this facility in altering the proportions of these constituents in the final product is very great, inasmuch as the possibility of quickly decorating a plaster surface after setting depends on the chemical properties of the plaster, such as acidity, alkalinity, etc. These chemical properties naturally depend on the relative proportion of the constituents referred to above, and are therefore entirely under control by the improved method object of the present invention. Moreover, I have found that the possibility of varying the proportion of adjuvants as desired, enables me to control in a perfect manner the time taken for the setting of the product; this time may be varied from 5 minutes or less (in fact practically instantaneously if desired), for example, when the mixture is used for moulding, to 18 hours or more.

Particularly, I have found that a mixture of zinc sulphate with potassium sulphate or with ammonium sulphate, in varying percentages, gives very satisfactory results.

As an example of the former mixture, zinc sulphate may be added up to 2% of the anhydrite and potassium sulphate up to 4% of the anhydrite. Particularly 1½% of zinc sulphate and 1% potassium sulphate give very good results. Adjuvants or fillers, such as a colouring matter, may of course be added to the plaster before use.

What I claim and desire to secure by Letters Patent is:—

1. A process for the manufacture of an improved plaster, consisting in that a double salt of an alkali metal is formed within a mass of natural mineral anhydrite in a very highly divided and uniformly distributed state, by adding to the anhydrite the individual component inorganic salts which constitute the double salt.

2. A process as claimed in claim 1, further characterized in that the proportion of the said component salts is different from that of the said components in the double salt.

3. A process as claimed in claim 1, in which the salts added are zinc sulphate and potassium sulphate.

4. A process as claimed in claim 1, in which zinc sulphate up to 2% of the anhydrite and potassium sulphate up to 4% of the anhydrite, are added.

5. A process for the manufacture of plaster, consisting in that a double salt of an alkali metal is formed within a mass of natural mineral anhydrite in a very highly divided and uniformly distributed state, by adding to the anhydrite the individual component inorganic salts which constitute the double salt, so as to form the double salts in the midst of the mixture, together with a filler.

6. A mixture consisting of one hundred parts anhydrite, less than two parts zinc sulphate, and less than four parts potassium sulphate.

7. A mixture consisting of one hundred parts anhydrite, one and one-half parts zinc sulphate, and one part potassium sulphate.

In testimony whereof, I affix my signature.

VICTOR LEFEBURE.